(12) United States Patent
Hammerschmidt et al.

(10) Patent No.: US 8,583,652 B2
(45) Date of Patent: Nov. 12, 2013

(54) EFFICIENTLY REGISTERING A RELATIONAL SCHEMA

(75) Inventors: Beda Hammerschmidt, Los Gatos, CA (US); Zhen Hua Liu, San Mateo, CA (US); Thomas Baby, Maple Valley, WA (US); Kongyi Zhou, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 12/956,264

(22) Filed: Nov. 30, 2010

(65) Prior Publication Data

US 2012/0136868 A1     May 31, 2012

(51) Int. Cl.
*G06F 17/30* (2006.01)

(52) U.S. Cl.
USPC .......................... 707/741; 707/797; 707/803

(58) Field of Classification Search
USPC ....................................................... 707/741
See application file for complete search history.

(56) References Cited

U.S. PATENT DOCUMENTS

| 7,024,425 B2 | 4/2006 | Krishnaprasad et al. |
| 7,096,224 B2 | 8/2006 | Murthy et al. |
| 2003/0140308 A1* | 7/2003 | Murthy et al. ............... 715/500 |

* cited by examiner

*Primary Examiner* — Anteneh Girma
(74) *Attorney, Agent, or Firm* — Hickman Palermo Truong Becker Bingham Wong LLP

(57) ABSTRACT

A method, device, and non-transitory computer-readable storage medium are provided for efficiently registering a relational schema. In co-compilation and data guide approaches, a subset of entities from schema descriptions are selected for physical registration, and other entities from the schema descriptions are not physically registered. In the co-compilation approach, a first schema description references a second schema description, and the subset includes a set of entities from the second schema description that are used by the first schema description. In the data guide approach, the subset includes entities that are used by a set of structured documents. In a pay-as-you-go approach, schema registration includes logically registering entities without creating relational database structures corresponding to the entities. A database server may execute database commands that reference the logically registered entities. A request to store data for the entities may be executed by creating relational database structures to store the data.

10 Claims, 9 Drawing Sheets

---

RECEIVE REQUEST TO REGISTER AN UNSPECIFIED RELATIONAL SCHEMA FOR A SET OF STRUCTURED DOCUMENTS
502

CREATE STRUCTURAL REPRESENTATION OF ENTITIES FROM ONE OR MORE SCHEMA DESCRIPTIONS THAT ARE USED BY ONE OR MORE STRUCTURED DOCUMENTS OF THE SET OF STRUCTURED DOCUMENTS
504

REGISTER THE RELATIONAL SCHEMA BY CREATING RELATIONAL DATABASE STRUCTURES FOR THE USED ENTITIES WITHOUT CREATING RELATIONAL DATABASE STRUCTURES FOR ENTITIES IN THE ONE OR MORE SCHEMA DESCRIPTIONS THAT ARE NOT USED BY THE ONE OR MORE STRUCTURED DOCUMENTS
506

EFFICIENTLY REGISTERING A RELATIONAL SCHEMA

RELATED APPLICATIONS

The present application is related to U.S. Pat. No. 7,024,425, entitled Method And Apparatus For Flexible Storage And Uniform Manipulation of XML Data In A Relational Database System, filed on Sep. 6, 2001, the entire contents of which are incorporated herein by reference.

The present application is related to U.S. Pat. No. 7,096,224, entitled Mechanism for Mapping XML Schemas to Object-Relational Database Systems, filed on Sep. 27, 2002, the entire contents of which are incorporated herein by reference.

FIELD OF THE INVENTION

The present invention relates to registering a relational schema in a relational database.

BACKGROUND

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

Structured Data

Structured data includes nodes of data and contextual clues about the nodes of data. In a text document, a context may be provided for a data value by tagging or labeling the data value within the text. The context for a data value may be provided by a single label or a combination of labels, such as a hierarchical path of labels. In one example, a value of "Tom" may be prefaced with a label of "Name". Various markup signals may be used to distinguish between the data values and the labels themselves. For example, a label may be marked with a "//", such as in "//Name Tom," or a "-", such as in "-Name Tom". In many markup languages, the label is provided within angle brackets, such as in "<Name>Tom." The end of the data value may also be marked. For example, the end may be marked with "</Name>." The end may also be marked by the beginning of another label, for example "-Name Tom -Age 25". The marked up data may indicate a hierarchical structure such that a single data value falls under a path of labels, such as in "<CONTACT><NAME>Tom</NAME></CONTACT>," where "Tom" falls under the path of "CONTACT/NAME." Alternately, data values may be marked with individual labels that do not specify a hierarchical path, such as in "-Name Tom -Age 25."

In one embodiment, nodes of the structured data form a hierarchy. Nodes may have one or more values, one or more attributes, and one or more hierarchical relationships to one or more other nodes. The resulting hierarchical structure of the data is discussed in terms akin to those used to discuss a family tree. For example, a node nested within another node may be described as the child node or sub-node of the other node or parent node. Grandchildren, grandparents, and other descendants and ancestors may be similarly defined. Collectively, a node along with its values, attributes, and sub-nodes, is referred to as a tree or a sub-tree.

A complex node is a node that holds more than a mere scalar value. In other words, data within the complex node is defined according to some structure. For example, a parent node with one or more child nodes is a complex node. In another example, a parent node with attributes may be described as a complex node. One example of a simple node is a child node with a value but no descendants.

Examples of structured data may be described herein in the context of data that conforms to the Extensible Markup Language (XML). However, structured data is not limited in that regard. Other forms of structured data, where hierarchical positions are defined between nodes of data, may also be used. For example, structured data may include a collection or stream of Java objects.

XML

Extensible Markup Language (XML) is an example markup language that is used to provide context for data that is stored in a document. XML is a World Wide Web Consortium (W3C) standard for representing data. Many applications are designed to output data in the form of XML documents. The techniques described herein relate to registering a schema for structured documents. XML is described herein as one example of providing context for nodes of data in a document, but those of ordinary skill in the art would appreciate that there are an unlimited number of possible ways to provide context for nodes of data in a document. This description is intended to cover all possible ways in which context may be provided for nodes of data.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. As a node of structured data, an XML element may have one or more child elements. A complex element is an element that holds more than a data value. In other words, one or more other elements or attributes are identified within the complex element. A simple element may have a data value, but simple elements generally do not have attributes or sub-elements.

Registering a Schema

A relational database may store structured documents as a single block of text or by splitting up the nodes of structured data and storing the nodes in separate relational database structures such as tables and types. To facilitate storage, retrieval, and modification of structure data, users register schema descriptions with the relational database server. The schema descriptions define a structure to which the structured documents conform. During schema registration, the relational database server may create separate relational database structures for every node or every complex node in the schema descriptions. The server uses Data Definition Language (DDL) commands such as the CREATE TABLE command to create relational database structures within the database. During registration, the server also stores metadata that describes the relationships between relational database structures and provides context for the relational database structures.

As used herein, the term "relational database structures" refer to database structures such as tables and types in an object-oriented database. In an object-oriented database, objects, classes, inheritance, and data types are supported in relational schemas and in the query language.

Once the relational schema has been registered, the relational database server has relational database structures available to store any data that conforms to the schema descriptions. In one example, relational database structures are created for every complex node, and simple nodes and/or attributes are stored in the relational database structure corresponding to a complex parent node. In another example, separate relational database structures are also created for simple nodes and/or attributes. After schema registration, the relational database server may evaluate database commands to store, retrieve, and/or modify structured data stored in the relational database structures. In one example, a received command that references a node in a hierarchy of nodes is mapped to a relational database structure that stores the data for the node.

In a request to register schemas for a set of XML documents, a database user may identify XML schemas to which a set of XML documents conform. During schema registration, the relational database server registers the XML schemas by creating separate relational database structures for every complex element mentioned in the XML schemas. According to one technique, once the XML schemas have been registered, documents that conform to the XML schemas may be stored in an XMLType datatype column in the relational database, as described in U.S. Pat. No. 7,024,425, entitled Method And Apparatus For Flexible Storage And Uniform Manipulation of XML Data In A Relational Database System, which has been incorporated by reference herein. When an XML document is stored in the XMLType column, the database server maps attributes and elements of the XML document to separate columns in the relational database, and the database server stores mapping information that maps the attributes and elements of the XML document to the columns in the relational database where the attributes and elements are actually stored. Storage of data as the XMLType causes the data to be decomposed into relational database structures that represent nodes of XML content.

Described herein are techniques for efficiently registering large schemas.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
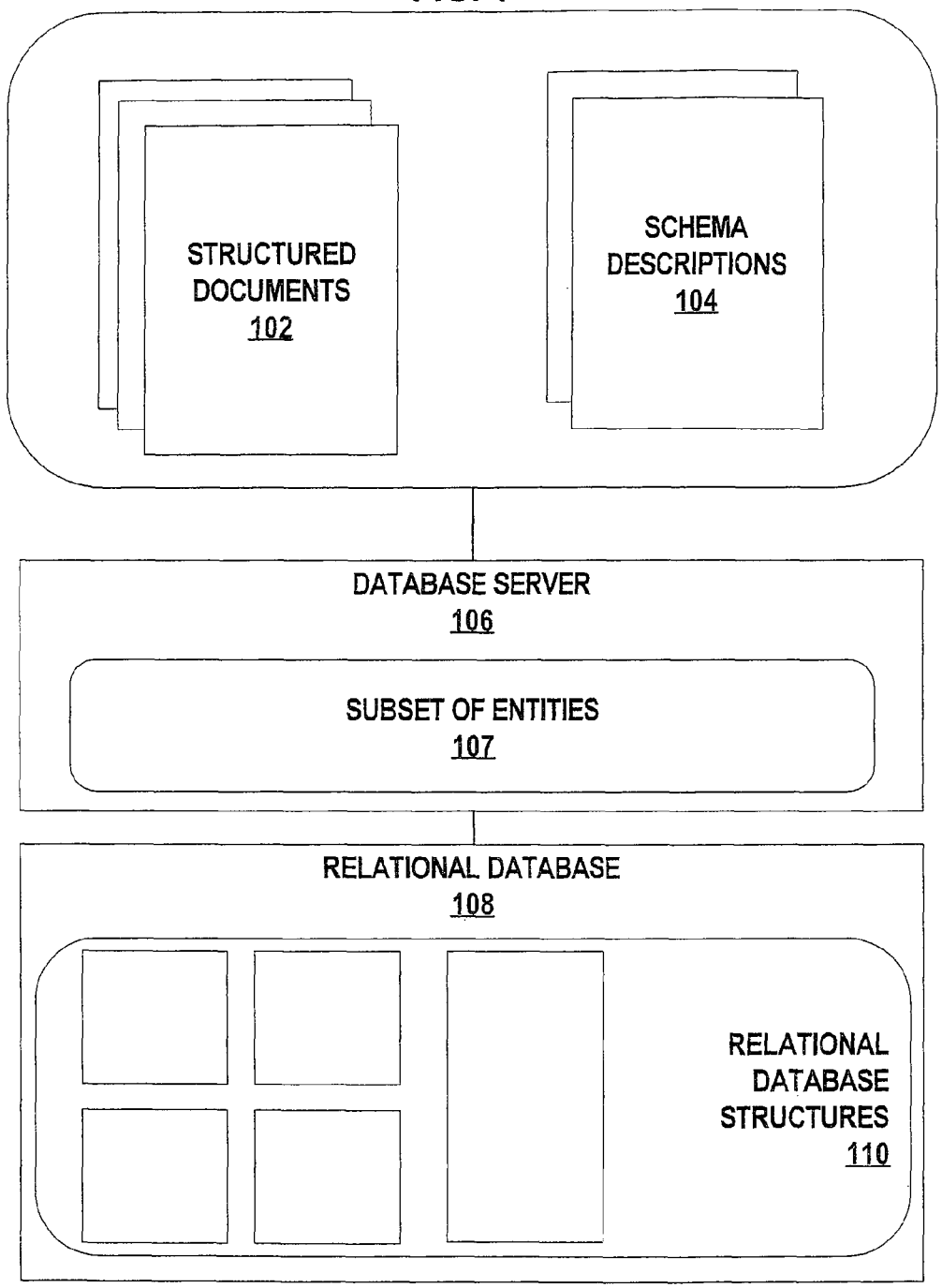
FIG. 1 is a block diagram that illustrates an example system for registering a relational schema by creating relational database structures for a subset of entities in schema descriptions.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, device, and non-transitory computer-readable storage medium are provided for efficiently registering a relational schema. In co-compilation and data guide approaches, a subset of entities from schema descriptions are selected for physical registration, and other entities from the schema descriptions are not physically registered. In co-compilation approaches, a first schema description references a second schema description, and the subset includes a set of entities from the second schema description that are used by the first schema description. In data guide approaches, the subset includes entities that are used by a set of structured documents. In pay-as-you-go approaches, schema registration includes logically registering entities without creating relational database structures corresponding to the entities. A database server may execute database commands that reference the logically registered entities. A request to store data for the entities may be executed by creating relational database structures to store the data.

Once a relational schema has been registered, a set of structured documents that conform to the schema descriptions may be stored in the relational database. If the relational schema was logically registered, relational database structures are created as needed when data from the set of structured documents is stored in the relational database. If the relational schema was physically registered, relational database structures were created in the relational database during physical registration, and these relational database structures may be used to store data from the set of structured documents. In one embodiment, the relational database structures include relational database tables and types. In one embodiment, the set of structured documents is a set of XML documents, and the schema descriptions are XML schemas.

Co-compilation approaches include receiving a request to create relational database structures for storing, in a relational database, structured documents described by a first schema description that references a second schema description. In one embodiment, the request is received on one or more machines running a schema registration server such as a database server. The request may specify one or more relational database structures that are to be created upon registration, but the request does not need to specify the relational database structures to be created. The request may identify the first schema description, from which the server determines a set of relational database structures to be created. In response to receiving the request, the server automatically determines that the first schema description uses a first set of entities of the second schema description, wherein the second schema description includes the first set of entities and a second set of entities that are not used by the first schema description. The server automatically creates relational database structures corresponding to the entities in the first schema description and the first set of entities of the second schema description without creating relational database structures corresponding to the second set of entities of the second schema description.

Data guide approaches include receiving a request to create unspecified relational database structures for storing, in a relational database, a set of structured documents described by one or more schema descriptions. The request may specify a set of structured documents and/or a set of schema descriptions from which the server determines a set of relational database structures to be created. In response to receiving the request, the server automatically uses selected structured documents and the schema descriptions to create a structural representation of entities in the schema descriptions that are used by the selected structured documents. In one embodiment, the structural representation is a tree of nodes, and each node in the tree corresponds to a different entity that is both present in the schema descriptions and used by the selected structured documents. The database server automatically creates relational database structures corresponding to the entities used by the selected structured documents without creating relational database structures corresponding to entities not used by the selected structured documents.

In one embodiment, registration of the schema includes creating a structured index that indexes a subset of entities from the schema descriptions that are physically registered. For example, indices may be created for entities in a first schema description and a subset of entities in a second schema description that are used by the first schema description. As another example, indices may be created for entities in the schema descriptions that are used by the set of structured documents.

Pay-as-you-go approaches include receiving a request to create an unspecified relational schema for storing, in a relational database, structured documents described by one or more schema descriptions. In one embodiment, the request is received on one or more machines running a server. In response to receiving the request, the database server stores, in a relational database, information that defines a set of entities included in the one or more schema descriptions without creating relational database structures for the set of entities. In one embodiment, the database server uses the stored information to execute a database command that references one or more entities of the set of entities even though one or more relational database structures for the one or more entities have not been created. In one example, the request to execute the one or more database commands is received from a client, and the one or more database commands are executed without any indication to the client that the one or more relational database structures did not exist when the request was received. In this manner, from the client's perspective, database commands are executed as if the relational database structures already existed.

In another embodiment, the database server receives a request to store data for one or more entities of the set of entities. In response to receiving the request to store the data for the one or more entities, the database server uses the stored information to create one or more new relational database structures for the one or more entities. The data may then be stored in the one or more new relational database structures. In one embodiment, the request to store data is received from a client, and the request to store data is executed without any indication to the client that the one or more relational database structures did not exist when the request to store data was received. In this manner, from the client's perspective, the request to store the data is executed as if the relational database structures already existed.

Registering a Subset of Entities from Schema Descriptions

A relational database stores nodes of data from structured documents in separate relational database structures such as tables and types. In one embodiment, these relational database structures are created during schema registration by a database server in response to a request to create a relational schema for a set of structured documents that conform to one or more schema descriptions. The request is processed by the server to create relational database structures using information from one or more schema descriptions and/or one or more sample structured documents, even though at least some of the relational database structures created were not specified within the request. In this manner, registration may be accomplished by referring to schema descriptions and/or sample structured documents without specifying the DDL commands to be performed in order to create relational database structures for the entities referenced in the schema descriptions and/or sample structured documents. In various other embodiments, the request may also specify relational database structures to be created in addition to those created automatically using the one or more schema descriptions and/or the one or more sample structured documents. The schema descriptions define a structure to which structured documents conform, including, for example, hierarchical relationships between entities that are allowed, optional or required, in the structured documents. The server uses the one or more schema descriptions and/or the one or more sample structured documents to determine which entities should be physically registered within the database.

Once the relational schema has been physically registered, the relational database structures for the selected entities are available in the relational database to store nodes of data from the structured documents. In one embodiment, the database server physically registers only a subset of entities from the one or more schema descriptions and/or from the one or more sample structured documents, and the one or more schema descriptions and/or the one or more sample structured documents include other entities that are not physically registered in the relational database.

During schema registration, the subset of entities are physically registered without registering one or more other sets of entities from the one or more schema descriptions. In one embodiment, the server uses DDL commands such as CREATE TABLE to create relational database structures corresponding to the subset of entities without using the DDL commands for the other sets of entities. In one embodiment, the server stores metadata describing the relationships between the relational database structures corresponding to the subset of entities without storing metadata describing relationships between entities from the other sets of entities. In one embodiment, physical registration of the subset of entities stores mapping information for the subset of entities that allows database commands referencing the subset of entities to be mapped to the relational database structures storing the subset of entities. In this manner, database commands referencing the subset of entities may be efficiently evaluated against the data stored in the relational database structures. Mapping information does not need to be created or stored for the other sets of entities.

In one example, the relational database server presents XML documents stored in the relational database as single data items of the XMLType abstract datatype even though separate attributes and elements of the XML document are mapped to the separate relational columns and tables within the relational database. If an XML user submits a query to search XML documents for a value of a particular element, then the XML user's query is rewritten to access the relational column that holds values for the particular element.

In co-compilation approaches, the subset of entities is selected such that, once the relational schema has been registered, the relational database server has relational database structures available to store any data that conforms to a user schema description that references one or more other schema descriptions such as library schemas. In one embodiment, relational database structures are not created for entities in the one or more other schema descriptions unless those entities are used by the user schema description.

In data guide approaches, the subset of entities is selected such that, once the relational schema has been registered, the relational database server has relational database structures available to store any data that includes elements from a set of sample structured documents. In one embodiment, relational database structures are not created for entities that do not appear in the set of sample structured documents.

In one embodiment, the subset of entities is selected prior to schema registration by a component outside of a database server. During schema registration, a request may identify the subset of entities to be physically registered instead of or in addition to identifying the schema descriptions that are the subject of the schema registration.

FIG. 1 illustrates an example system for registering schema descriptions by creating relational database structures for a subset of entities in the schema descriptions. As shown, structured documents 102 are associated with schema descriptions 104. For example, structured documents 102 may reference schema descriptions 104 and/or conform to schema descriptions 104. Database server 106 receives information about structured documents 102 and/or schema descriptions 104 and determines a subset of entities 107 to be physically registered in relational database 108. Database server 106 creates relational database structures 110 for subset of entities 107, but not for other entities of structured documents 102 and/or schema descriptions 104.

Co-Compilation Approaches to Schema Registration

Co-compilation approaches involve selecting a subset of entities in a set of schema descriptions based on those entities actually used by one or more of the set of schema descriptions. A user or client submits a request to create relational database structures for storing, in a relational database, structured documents described by a first schema description that references one or more other schema descriptions. In one embodiment, the request is received on one or more machines running a server. The request does not specify the relational database structures to be created, but the request may identify one or more schema descriptions and/or one or more structured documents to be stored in the relational database. In response to receiving the request, the database server automatically determines that the first schema description uses a first set of entities of the one or more other schema descriptions, wherein the one or more other schema descriptions include the first set of entities and a second set of entities that are not used by the first schema description. The server automatically creates relational database structures corresponding to the entities in the first schema description and the first set of entities of the one or more other schema descriptions without creating relational database structures corresponding to the second set of entities of the one or more other schema descriptions.

In one embodiment, the method includes identifying the elements in the one or more other schema descriptions that are referenced or mentioned in the first schema description. "Referencing" means, that the entities defined in the "referenced" schema are accessible to the "referencing" schema even though the referenced entities are not defined in the referencing schema. For example, a customer schema may reference a set of library schemas. A referenced library schema might also reference other schemas, which may also have referenced entities and be included in the set of referenced schemas.

In addition to the elements directly referenced by the first schema description, ancestor elements along a path from a root node to the referenced elements may also be identified in a set of elements that are used by the first schema description. Further, descendant elements that are optional or required under the referenced elements may be identified in the set of elements that are used by the first schema description. In one example, indirect ancestors of the referenced element such as uncles and great uncles are not in the set of used elements. In another example, indirect descendants of the referenced element such as nephews and great nephews are not in the set of used elements. In other examples, siblings and cousins of the referenced element may be excluded from the set of used elements. The set of used elements may include each element in the one or more other schema descriptions that is used, directly or indirectly, by an element used or referenced in the first schema description. In one embodiment, a directed graph is constructed to determine those elements in the one or more other schema descriptions that are used by the first schema description. The techniques described herein are not limited to a particular implementation for determining whether elements in one or more other schemas are used by the first schema, and some implementations may include more distant relatives than other implementations.

In one embodiment, the references between elements and types span a graph that connects a set of one or more customer schemas with a set of one or more library schemas. Each schema is regarded as a tree of nodes. The set of customer schemas and library schemas is a set of trees that are connected by references. The result is a graph with a list of entry points, or global elements of the customer schema(s).

In one embodiment, a depth first search algorithm starts on every global element of the customer schema. If a reference to a type is encountered the traversal code marks this type as being used in the tree of nodes. The traversal code continues from this referenced node. If no more new references are found the recursion terminates for that level and continues for earlier levels.

In one embodiment, a set of used entities in the schema descriptions is defined when all referenced nodes have been visited and marked. Types that are not used can be removed from the schema since they are not relevant for the customer's user case. If removal is not an option, the types could be annotated in a way that no table will be created when the schema descriptions are registered in the database. As a result of registering fewer than all entities in a library schema, registration of the library schema may be less complex and occur in less time with fewer tables being created. In one embodiment, further simplification of the schema is performed when a customer selects one or more global elements from the total set of global elements as valid root elements.

Figure 2:
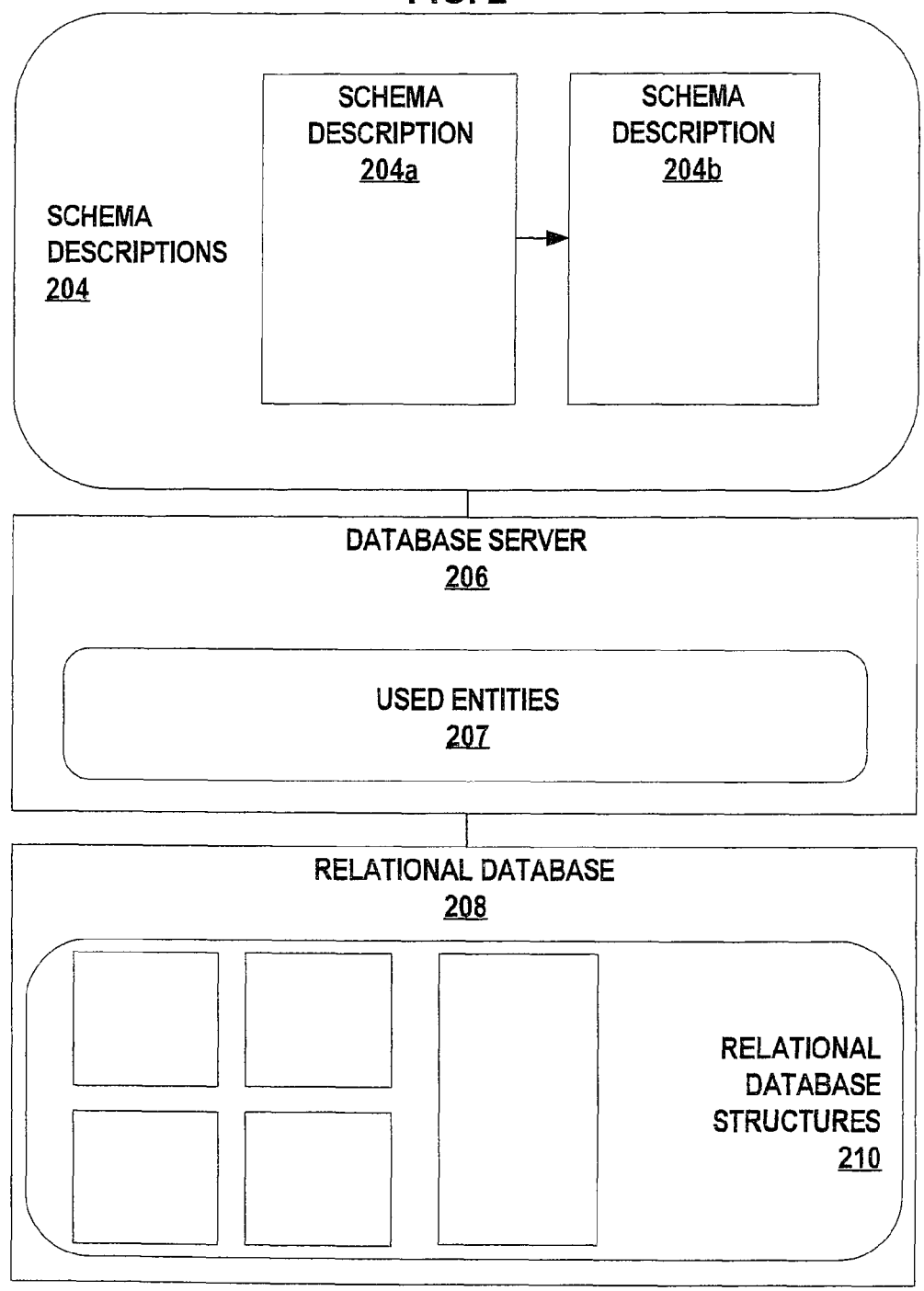
FIG. 2 and FIG. 3 are block diagrams that illustrate an example system and process for registering a relational schema based on a first schema description that references a second schema description by determining the entities in the second schema description that are used by the first schema description.

FIG. 2 illustrates an example system for registering a first schema description that references a second schema description by determining the entities in the second schema description that are used by the first schema description. As shown, database server 206 accesses schema descriptions 204a and 204b of schema descriptions 204. Database server 206 determines used entities 207 from schema description 204b at least in part by determining the entities in schema description 204b that are referenced by schema description 204a. In one embodiment, schema description 204a requires used entities 207 from schema description 204b. In another embodiment, used entities 207 support schema description 204a by defining tables and types that are referenced in schema description 204a. Database server 206 physically registers used entities 207 in relational database 208 by creating relational database structures 210 that correspond to used entities 207 but not to unused entities from schema description 204b. In one embodiment, database server 206 also creates relational database structures 210 that correspond to the entities in schema description 204a.

Figure 3:
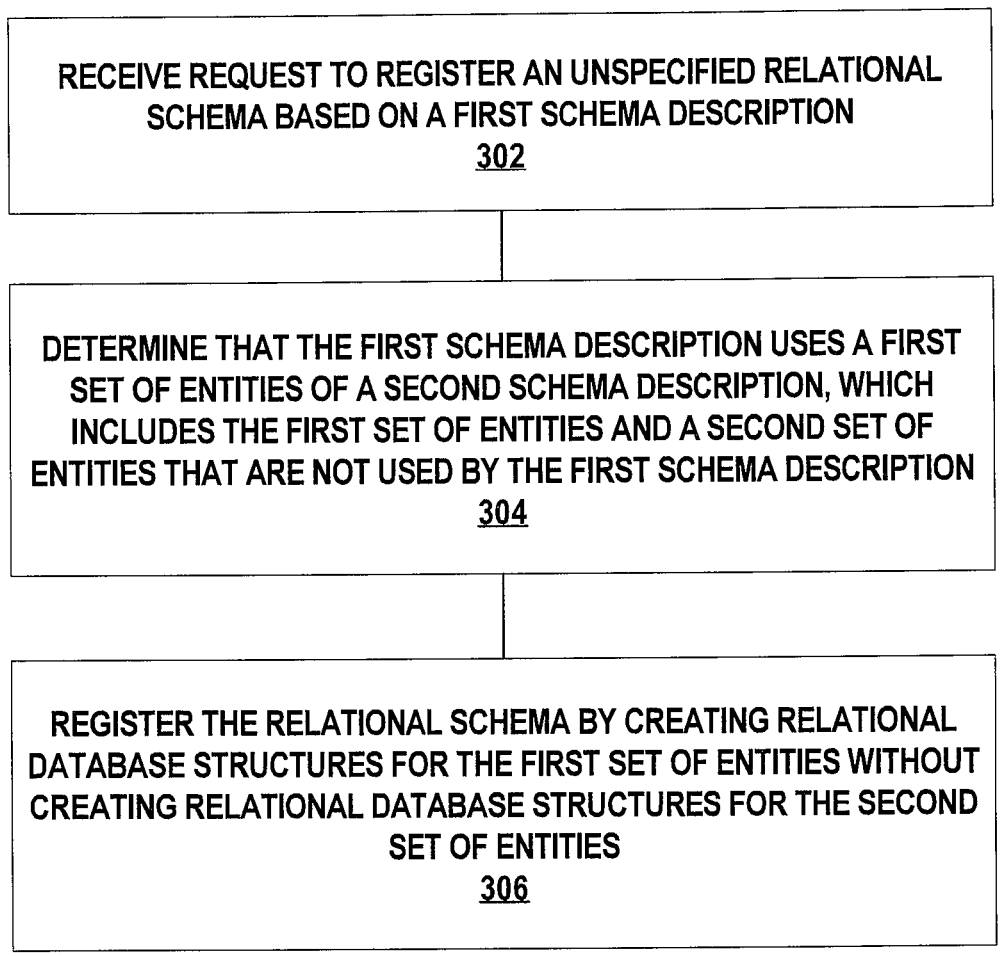

FIG. 3 illustrates an example process for registering a first schema description that references a second schema description by determining the entities in the second schema description that are used by the first schema description. In step 302, a computing device receives a request to register an unspecified relational schema based on a first schema description. In step 304, a determination is made that the first schema description uses a first set of entities of a second schema description, which includes the first set of entities and a second set of entities that are not used by the first schema description. The relational schema is registered in step 306 by creating relational database structures for the first set of entities used by the first schema description without creating relational database structures for the second set of entities not used by the first schema description.

In one example, a request to register a relational schema is associated with a user schema description that references one or more other schema descriptions. The following user schema fragment is a non-limiting example fragment of a user schema description for a set of XML documents.

| User Schema Fragment |
| --- |
| <xsd:schema targetNamespace="http://niem.gov/niem/recovery-gov/2.0" <br> xmlns:georss="http://www.georss.org/georss/10" <br> xmlns:s="http://niem.gov/niem/structures/2.0" <br> xmlns:rg="http://niem.gov/niem/recovery-gov/2.0" <br> xmlns:nc="http://niem.gov/niem/niem-core/2.0" <br> xmlns:niem-xsd="http://niem.gov/niem/proxy/xsd/2.0" <br> xmlns:xsd="http://www.w3.org/2001/XMLSchema" <br> xmlns:xdb="http://xmlns.oracle.com/xdb"> <br>     <xsd:import namespace="http://niem.gov/niem/niem-core/2.0" <br> schemaLocation="niem/niem-core/2.0/niem-core.xsd"/> <br>     <xsd:import namespace="http://niem.gov/niem/structures/2.0" <br> schemaLocation="niem/structures/2.0/structures.xsd"/> <br>     <xsd:import namespace="http://www.georss.org/georss/10" <br> schemaLocation="niem/georss/georss11.xsd"/> <br>     <xsd:import namespace="http://niem.gov/niem/proxy/xsd/2.0" <br> schemaLocation="niem/proxy/xsd/2.0/xsd.xsd"/> <br>     <xsd:element name="AccountCode" type="rg:AccountCodeType" <br> nillable="true" <br> xdb:defaultTable="AccountCode_TAB"/> <br>     <xsd:element name="AccountNumber" type="nc:TextType" <br> xdb:defaultTable="AccountNumber_TAB"/> <br>     <xsd:element name="Address" type="rg:AddressType" <br> nillable="false"/> |

The namespace for the user schema description is defined as http://niem.gov/niem/recovery-gov/2.0. In the example, the user schema description imports one or more other schema descriptions, including "niem/niem-core/2.0/niem-core.xsd," which defines the entity rg:AddressType, for example, in the following first library schema fragment:

| First Library Schema Fragment |
| --- |
| <xsd:complexType name="AddressType"> <br>   <xsd:annotation> <br>     <xsd:documentation>A data type for a geophysical location described by postal information.</xsd:documentation> <br>     <xsd:appinfo> <br>       <i:Base i:namespace="http://niem.gov/niem/structures/2.0" <br>       i:name="Object"/> <br>     </xsd:appinfo> <br>   </xsd:annotation> <br>   <xsd:complexContent> <br>     <xsd:extension base="s:ComplexObjectType"> <br>       <xsd:sequence> <br>         <xsd:element ref="nc:AddressRepresentation" minOccurs="0" maxOccurs="unbounded" xdb:SQLInline="false" xdb:defaultTable="AddressRepresentatio_TAB"/> <br>       </xsd:sequence> <br>     </xsd:extension> <br>   </xsd:complexContent> <br> </xsd:complexType> |

The other schema description in the example, "niem-core.xsd," also defines other entities that the user may not use, such as "AircraftType," in the following second library schema fragment:

---

Second Library Schema Fragment

```
<xsd:complexType name="AircraftType">
  <xsd:annotation>
    <xsd:documentation>A data type for a mode of transportation capable
of flying in the air.</xsd:documentation>
    <xsd:appinfo>
      <i:Base i:name="ConveyanceType"/>
    </xsd:appinfo>
  </xsd:annotation>
  <xsd:complexContent>
    <xsd:extension base="nc:ConveyanceType">
      <xsd:sequence>
        <xsd:element ref="nc:AircraftTailID" minOccurs="0"
maxOccurs="unbounded"/>
        <xsd:element ref="nc:AircraftMakeCode" minOccurs="0"
maxOccurs="unbounded"/>
        <xsd:element ref="nc:AircraftModelCode" minOccurs="0"
maxOccurs="unbounded"/>
        <xsd:element ref="nc:AircraftStyleCode" minOccurs="0"
maxOccurs="unbounded"/>
        <xsd:element ref="nc:AircraftFuselageColor" minOccurs="0"
maxOccurs="unbounded" xdb:SQLInline="false"
xdb:defaultTable="AircraftFuselageColo__TAB"/>
        <xsd:element ref="nc:AircraftWingColor" minOccurs="0"
maxOccurs="unbounded" xdb:SQLInline="false"
xdb:defaultTable="AircraftWingColor__TAB"/>
        <xsd:element ref="nc:AircraftBaseAirport" minOccurs="0"
maxOccurs="unbounded" xdb:SQLInline="false"
xdb:defaultTable="AircraftBaseAirport__TAB"/>
      </xsd:sequence>
    </xsd:extension>
  </xsd:complexContent>
</xsd:complexType>
```

---

In the example, the "AddressType" entity is used by the user schema description, but the "AircraftType" entity is not used by the user schema description. Accordingly, the database server creates relational database structures in the relational database to represent the "AddressType" entity, but the database server does not create relational database structures in the relational database to represent the "AircraftType" entity. For example, the database server may create an "AddressType" table with columns associated with sub-elements or attributes of the entity. Other user schema descriptions may use the "AircraftType" entity but not the "AddressType" entity. In various examples, library schemas may include thousands or even hundreds of thousands of entities, of which only a small subset of entities are used.

In one embodiment, the library schema description is modified after the user schema description is created but before the relational schema is registered with the database server. Upon schema registration, the used elements are determined from the library schema as modified, which is referenced in the user schema description. In one embodiment, the library schema description is referenced by several user schema descriptions, each of which uses different elements from the library schema description. In one embodiment, multiple library schema descriptions reference each other. The user schema description may also reference several library schema descriptions.

Data Guide Approaches to Schema Registration

Data guide approaches involve selecting a subset of entities in a set of schema descriptions based on those entities actually used by a sample set of structured documents. A user or client submits a request to create unspecified relational database structures for storing, in a relational database, a set of structured documents described by one or more schema descriptions. In one embodiment, the request is received on one or more machines running a server. In response to receiving the request, the database server automatically uses sample structured documents and the schema descriptions to create a structural representation of entities in the schema descriptions that are used by the sample structured documents. In one embodiment, the structural representation is a tree of nodes, and each node in the tree corresponds to a different entity that is both present in the schema descriptions and used by the sample structured documents. The database server automatically creates relational database structures corresponding to the entities used by the sample structured documents without creating relational database structures corresponding to entities not used by the sample structured documents.

In one embodiment, the method involves creating a structural representation of entities defined in the one or more schema descriptions. Sample structured documents are scanned, and entities in the structural representation are marked when the entities appear in the structured documents. In one embodiment, each marked entity is only marked once, indicating that the entity is used by the set of sample structured documents. After scanning the set of sample structured documents, a first set of entities in the structural representation are marked, and a second set of entities in the structural representation are not marked. The database server automatically creates relational database structures corresponding to the marked entities without creating relational database structures corresponding to the unmarked entities.

Figure 4:
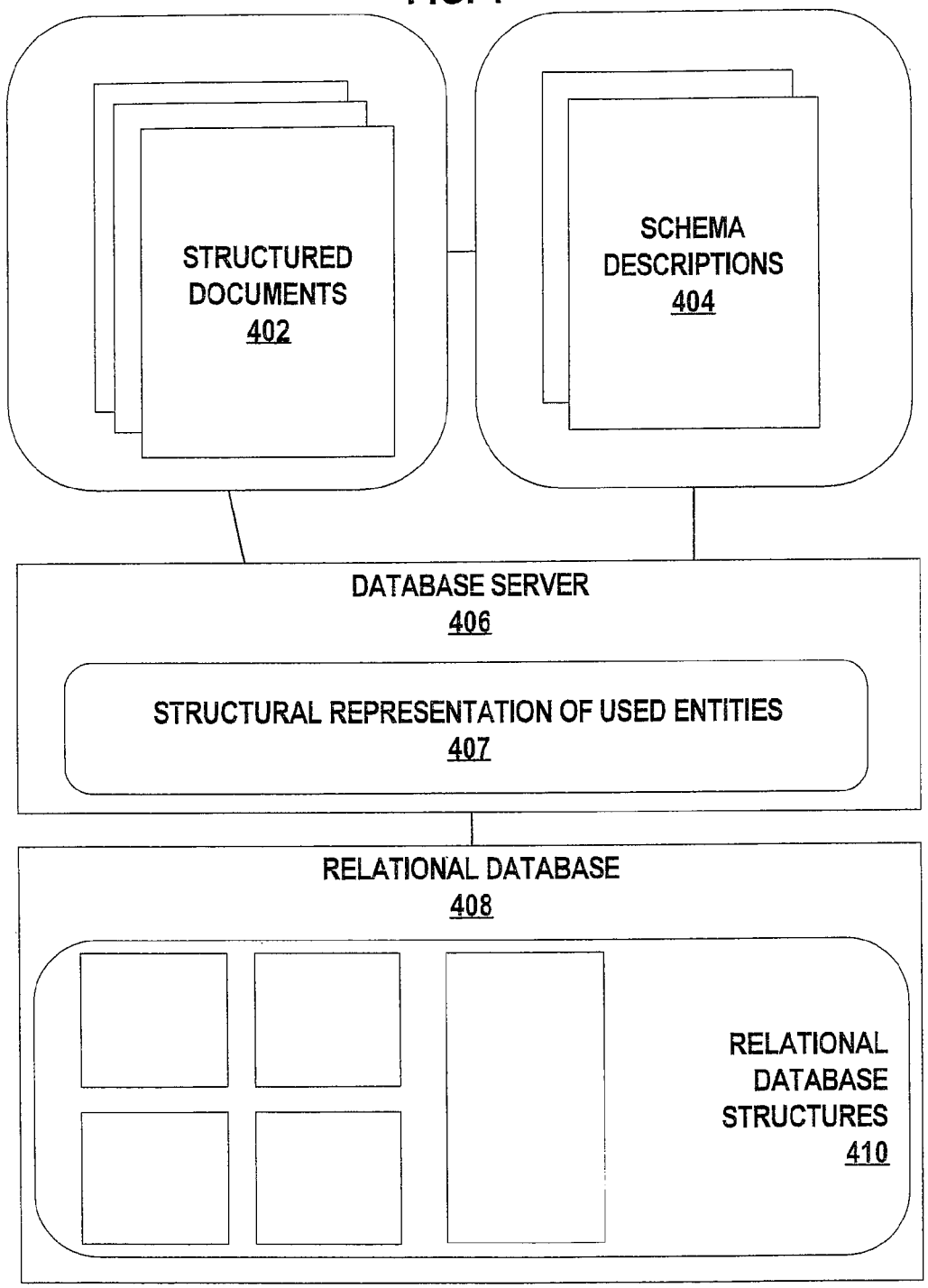
FIG. 4 and FIG. 5 are block diagrams that illustrate an example system and process for registering a relational schema based on a structural representation of entities in schema descriptions that are used by structured documents.

FIG. 4 illustrates an example system for registering a relational schema based on a structural representation of entities in the schema descriptions that are used by one or more structured documents. As shown, database server 406 creates a structural representation of used entities 407 based on schema descriptions 404 and structured documents 402. In one example not shown, a sample subset of structured documents is used to estimate which entities are used in the entire set of structured documents 402. In another example, the entire set of structured documents 402 is scanned to determine which entities are used in the entire set of structured documents 402. In one embodiment, a structural representation of entities is created from schema descriptions 404, and the structural representation is marked based on those entities appearing in structured documents 402. As a result, database server 406 generates structural representation of used entities 407. Based on structural representation of used entities 407, relational database structures 410 are created in relational database 408 for entities of schema descriptions 404 that are used by structured documents 402, but not for entities of schema descriptions 404 that are not used by structured documents 402.

Figure 5:
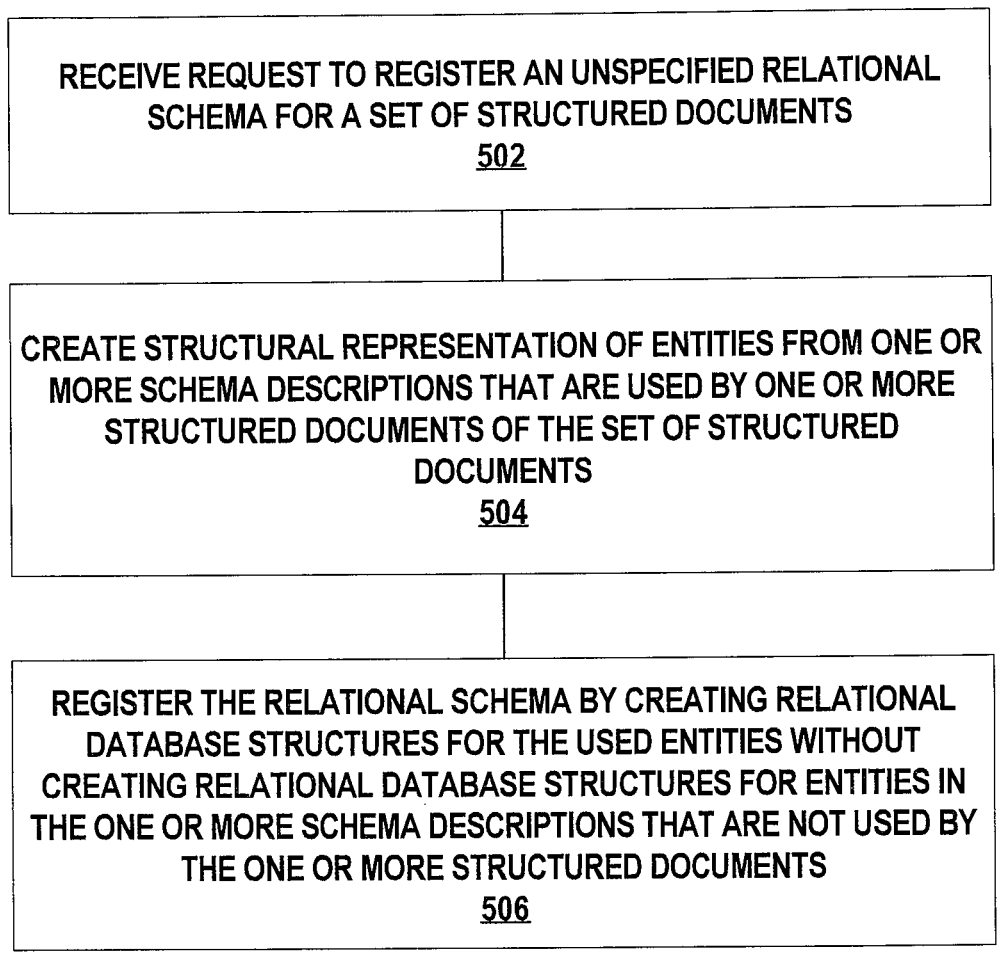

FIG. 5 illustrates an example process for registering a relational schema based on a structural representation of used entities in the schema descriptions. In step 502, one or more computing devices receive a request to register an unspecified relational schema for a set of structured documents. Step 504 includes creating a structural representation of entities from one or more schema descriptions that are used by one or more structured documents of the set of structured documents. The relational schema is registered in step 506 by creating relational database structures for the used entities without creating relational database structures for entities in the one or more schema descriptions that are not used by the one or more structured documents.

Selecting Indices for Creation Upon Schema Registration

In one embodiment, registration of the schema includes creating a structured index that indexes one or more entities of the subset of entities from the schema descriptions that are physically registered. In one embodiment, the structured index is a path index that facilitates a path-based lookup of the entities. For example, the path index may be an XML index used to evaluate an XQuery expression that uses XPath syntax to address one or more nodes in a set of XML documents. Indices can be costly to maintain, in terms of time and resources. In one embodiment, the techniques described herein reduce this cost by avoiding the creation of indices for unused entities.

In the co-compilation approaches, indices may be created for entities in a first schema description and a subset of entities in a second schema description that are used by the first schema description. In the data guide approaches, indices may be created for entities in the schema descriptions that are used by the set of structured documents. In one example, a count is maintained for each entity. The count indicates how many times the entity is used in the set of structured documents. In a particular embodiment, indices are created only for those entities that are used above a threshold amount of times in the set of structured documents.

In one embodiment, the structured documents are stored in an unstructured object in the database, such as a Character Large Object (CLOB) or Binary Large Object (BLOB) column, and the index is a structured index that indexes one or more entities of the subset of entities from in the structured documents. In this manner, a structured index such as a path index may be provided for a subset of entities that are stored in an unstructured column. The structured index may be stored in association with the unstructured object. For example, the structured index may be stored in a hidden column that is associated with the unstructured object.

Pay-As-You-Go Approaches to Schema Registration

Pay-as-you-go approaches involve logically registering entities from schema descriptions, thereby delaying or avoiding the cost of creating relational database structures that represent the entities until those relational database structures are actually needed to store data. A user or client submits a request to create an unspecified relational schema for storing, in a relational database, structured documents described by one or more schema descriptions. In one embodiment, the request is received on one or more machines running a server. In response to receiving the request, the database server stores, in a relational database, information that defines a set of entities included in the one or more schema descriptions without creating relational database structures, such as tables and types, for the set of entities. In one embodiment, the database server uses the stored information to execute a database command that references one or more entities of the set of entities even though one or more relational database structures for the one or more entities have not been created. In one example, the request to execute the one or more database commands is received from a client, and the one or more database commands are executed without any indication to the client that the one or more relational database structures did not exist when the request was received. In this manner, from the client's perspective, database commands are executed as if the relational database structures that were referenced in the database commands had already existed when the database commands were submitted.

In another embodiment, the database server receives a request to store data for one or more entities of the set of entities. In response to receiving the request to store the data for the one or more entities, the database server uses the stored information to create one or more new relational database structures for the one or more entities. The data may then be stored in the one or more new relational database structures. In one embodiment, the request to store data is received from a client, and the request to store data is executed without any indication to the client that the one or more relational database structures did not exist when the request to store data was received. In this manner, from the client's perspective, the request to store the data is executed as if the relational database structures that were needed to store the data had already existed when the request was submitted.

In one example, entities from the schema descriptions may be logically registered in the relational database by storing information about the entities in a dictionary table in the relational database. The stored information about the entities allows the database server to create relational database structures for the entities on demand, when the relational database structures are needed to store data. In one embodiment, the stored information includes object identifiers that are reserved for the relational database structures that have not yet been created. In an embodiment, the stored information provides information about hierarchical relationships between entities, which may be gleaned from the one or more schema descriptions.

In one embodiment, the user provides table names and/or type names during registration time, and the stored information includes tables names and/or type names specified by the user. In another embodiment, the system generates table names and/or type names during registration time, and the stored information includes the table names and/or type names generated by the system. In this manner, table names and type names may be known for the purpose of query rewrites and for the purpose of reserving table names and type names in the event that they are later physically created. In one embodiment, when creating a table or type, the database server checks a dictionary of stored information to determine whether the table or type name is already reserved by a logically registered table. If the table or type name is already reserved, then the logical reservation is held and the table or type is not created. When logically registered tables or types are later physically created in the database, known names for the tables or types are available. In one embodiment, table information is stored in one dictionary table and type information is stored in another dictionary table.

In one embodiment, logically registering the entities avoids creating any storage infrastructure to store the structured documents. In one example, logically registering the entities avoids allocating space that may later be allocated to store relational database structures when entities are physically registered with the database. In another embodiment, logically registering the entities avoids making a plurality of calls to the storage layer of the database for creating the relational database structures that represent the entities. Logically registering the entities avoids creating physical tables and types to represent the entities.

In one embodiment, an application programming interface is defined on top of the relational database structures such that a reference to a given relational database structure actually references a logical representation of the relational database structure. In one example, a query received by the database server is rewritten to reference the logical representations that are defined by the dictionary table. For example, if a query references a table that does not yet have a physical counterpart, then a logical representation of the table may be treated as an empty table. The dictionary table may store, in association with a logical representation of an object, an indication of whether the object has a physical counterpart that has already been created in the relational database.

In one embodiment, queries are executed against relational database structures that do not yet physically exist in the database as if they already existed. For example, a user may submit database commands to the database server without knowledge of whether or not the underlying physical database structures exist, and the database server may execute the commands without any indication to the user of whether or not the underlying physical database structures existed when the commands were submitted.

In another example, in response to a request to store a document in a relational database, an element of the document is mapped, using the dictionary table, to a logical table that represents the element. The logical tables may or may not have physical counterparts in the relational database. If the logical table has a physical counterpart, then the data for the element is stored in the physical counterpart. If the logical table does not yet have a physical counterpart, then the physical counterpart is created to store the data for the element. In one embodiment, an application programming interface creates a physical relational database structure when an entity is inserted, and a logical representation for the entity has no physical counterpart.

In one embodiment, requests to store data are executed to store data in relational database structures that did not exist when the requests were received. A user may submit a request to store data to the database server without knowledge of whether or not the underlying physical database structures exist, and the database server may execute the requests without any indication to the user of whether or not the underlying physical database structures existed when the requests were submitted.

Figure 6:
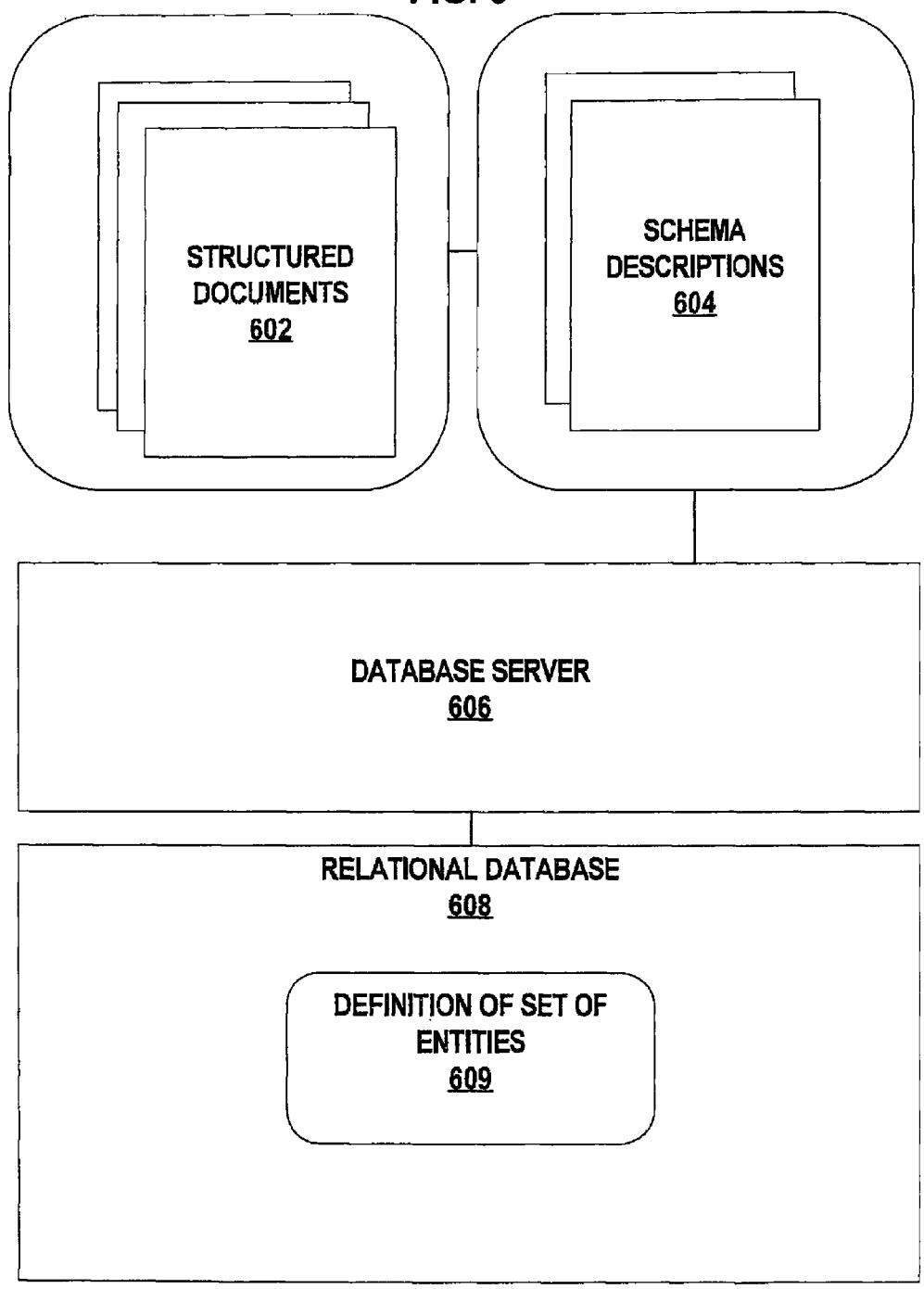
FIG. 6, FIG. 7, and FIG. 8 are block diagrams that illustrate an example system and processes for logically registering schema descriptions without creating relational database structures for entities in the schema descriptions.

FIG. 6 illustrates an example system for logically registering schema descriptions without creating relational database structures for entities in the schema descriptions. As shown, database server 606 uses schema descriptions 604 to create a definition of a set of entities 609 in relational database 608 without creating relational database structures to store data for entities in the set of entities.

Figure 7:
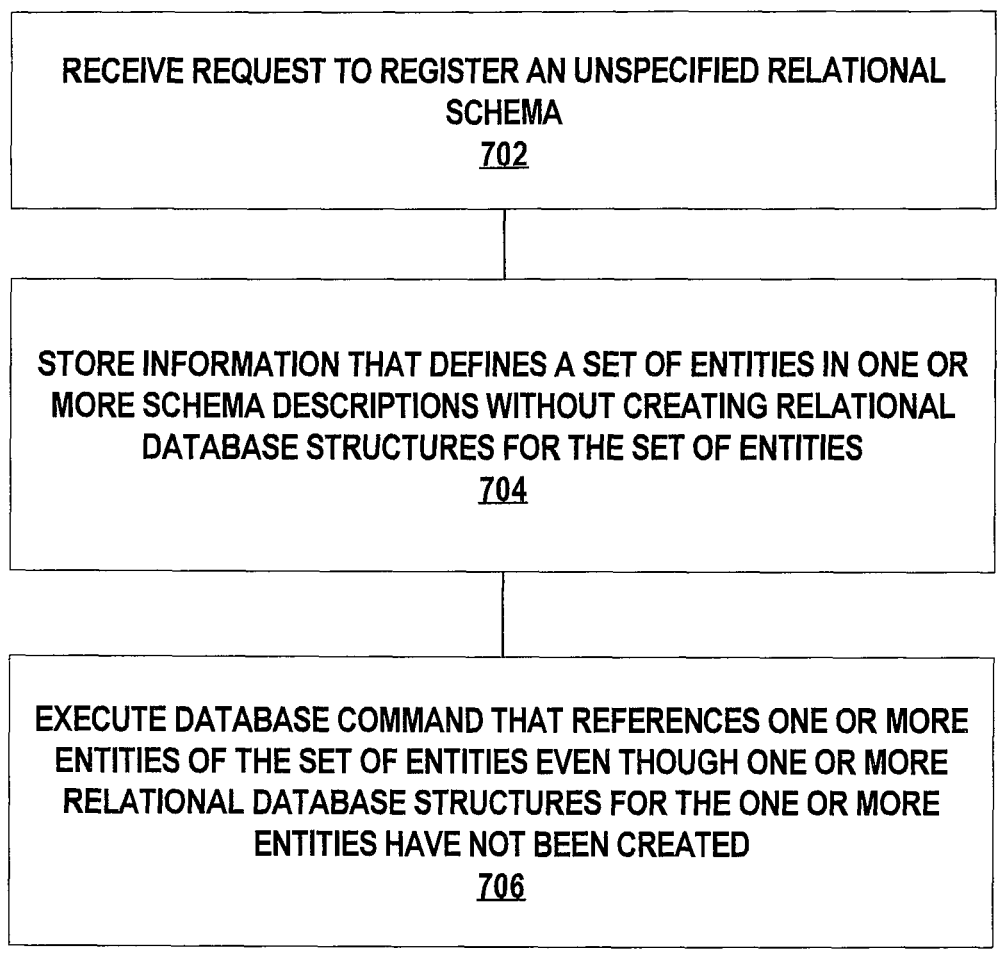

FIG. 7 illustrates an example process for logically registering schema descriptions without creating relational database structures for entities in the schema descriptions. In step 702, one or more computing devices receive a request to register an unspecified relational schema. Step 704 includes storing information that defines a set of entities in one or more schema descriptions without creating relational database structures for the set of entities. Once the information is stored, a database command that references one or more entities of the set of entities may be executed in step 706 even though one or more relational database structures for the one or more entities have not been created.

Figure 8:
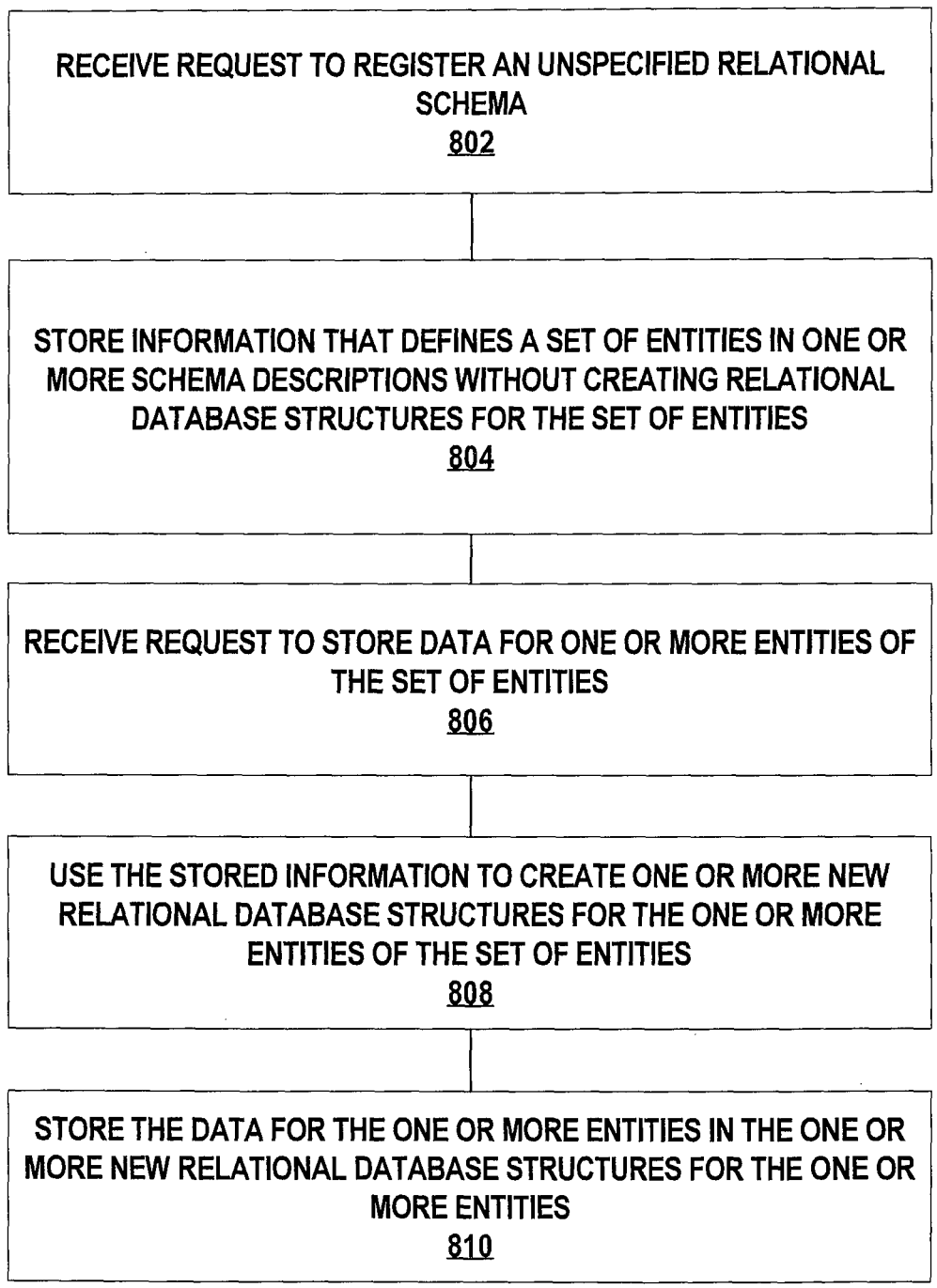

FIG. 8 illustrates another example process for logically registering schema descriptions without creating relational database structures for entities in the schema descriptions. In step 802, one or more computing devices receive a request to register an unspecified relational schema. Step 804 includes storing information that defines a set of entities in one or more schema descriptions without creating relational database structures for the set of entities. After the information has been stored, the one or more computing devices receive a request to store data for one or more entities of the set of entities, in step 806. The one or more computing devices use the stored information in step 808 to create one or more new relational database structures for the one or more entities of the set of entities. Then, in step 810, the one or more computing devices store the data for the one or more entities in the one or more new relational database structures for the one or more entities.

Combining Approaches

The various approaches described herein may be used separately or in combination with each other. For example, a co-compilation approach may be used to determine a subset of entities that are used by a customer schema, and a data guide approach may be used to determine which entities in the subset of entities are used by a sample set of structured documents. Further pruning of entities to be physically registered may be triggered by determining that above a certain threshold of entities are to be physically registered at the conclusion of one approach. In another example, a subset of entities may be physically registered according to the co-compilation approach and/or the data guide approach, and other entities from the one or more schema descriptions that are not physically registered are defined in a dictionary table according to the pay-as-you-go approach. The other entities may be physically registered as needed, but they do not need to be physically registered at the time of schema registration. In yet another example, entities are initially logically registered, and subsets of entities are physically registered as a background process. Subsets registered in the background may be determined using the co-compilation approach and/or the data guide approach. The background process may run on the database server whenever the database server is idle, experiencing a low workload, and/or experiencing a low demand on resources.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
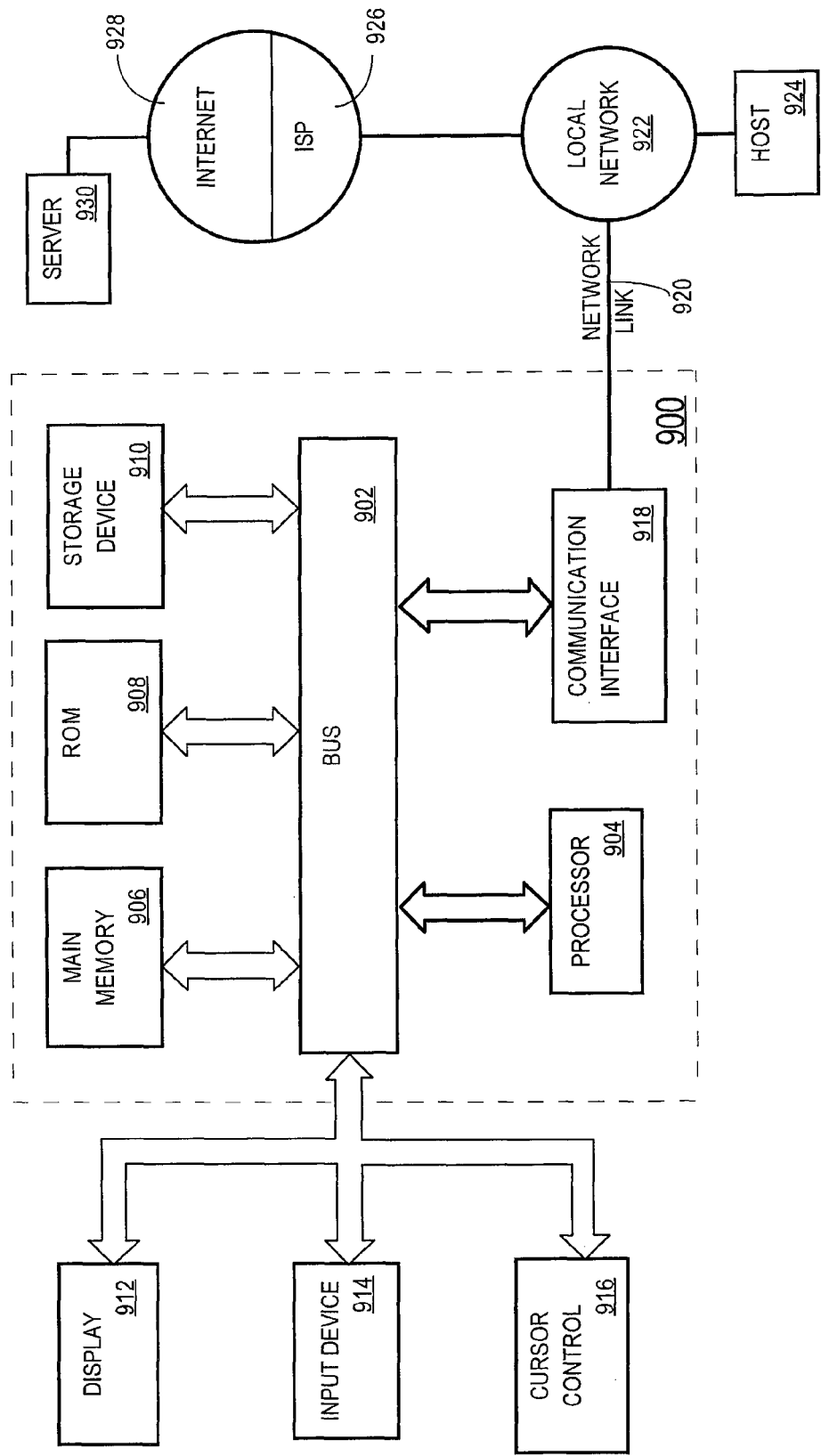
FIG. 9 is a block diagram that illustrates a computer system upon which an embodiment described herein may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a request to create unspecified relational database structures for storing, in a relational database, a set of structured documents described by one or more schema descriptions;

in response to receiving the request:

using one or more structured documents of the set of structured documents and the one or more schema descriptions to create a structural representation of entities in the one or more schema descriptions that are used by the one or more structured documents; and using the structural representation of entities that are used by the one or more structured documents, creating relational database structures corresponding to the entities that are used by the one or more structured documents, wherein the one or more schema descriptions include the used entities and other entities that are not used by the one or more structured documents;

wherein the method is performed by one or more special-purpose computing devices.

2. The method of claim 1, wherein the set of structured documents comprises a set of XML documents, wherein the one or more schema descriptions comprise one or more XML schemas.

3. The method of claim 1, wherein the created relational database structures comprise relational database tables and types.

4. The method of claim 1, wherein the structural representation is a tree of nodes, and wherein each node in the tree corresponds to a different used entity.

5. The method of claim 1, further comprising:

creating a structured index that indexes the used entities in the one or more structured documents.

6. One or more non-transitory storage media storing instructions which, when executed by one or more computing devices, cause:

receiving a request to create unspecified relational database structures for storing, in a relational database, a set of structured documents described by one or more schema descriptions;

in response to receiving the request:

using one or more structured documents of the set of structured documents and the one or more schema descriptions to create a structural representation of entities in the one or more schema descriptions that are used by the one or more structured documents; and using the structural representation of entities that are used by the one or more structured documents, creating relational database structures corresponding to the entities that are used by the one or more structured documents, wherein the one or more schema descriptions include the used entities and other entities that are not used by the one or more structured documents.

7. The one or more non-transitory storage media of claim 6, wherein the set of structured documents comprises a set of XML documents, wherein the one or more schema descriptions comprise one or more XML schemas.

8. The one or more non-transitory storage media of claim 6, wherein the created relational database structures comprise relational database tables and types.

9. The one or more non-transitory storage media of claim 6, wherein the structural representation is a tree of nodes, and wherein each node in the tree corresponds to a different used entity.

10. The one or more non-transitory storage media of claim 6, wherein the instructions, when executed, further cause:

creating a structured index that indexes the used entities in the one or more structured documents.

\* \* \* \* \*